United States Patent
Hwang et al.

(10) Patent No.: US 10,560,557 B2
(45) Date of Patent: *Feb. 11, 2020

(54) MOBILE TERMINAL

(71) Applicant: LG ELECTRONICS INC., Seoul (KR)

(72) Inventors: Kyoungsun Hwang, Seoul (KR); Moonsoo Song, Seoul (KR); Yoonjae Won, Seoul (KR); Deuksu Choi, Seoul (KR); Chisang You, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/383,399

(22) Filed: Apr. 12, 2019

(65) Prior Publication Data

US 2019/0312960 A1   Oct. 10, 2019

Related U.S. Application Data

(63) Continuation of application No. 16/022,512, filed on Jun. 28, 2018, now Pat. No. 10,306,029.

(Continued)

(30) Foreign Application Priority Data

May 3, 2018   (KR) .......................... 10-2018-0051314

(51) Int. Cl.
*H04M 1/00* (2006.01)
*H04M 1/02* (2006.01)
(Continued)

(52) U.S. Cl.
CPC .......... *H04M 1/0202* (2013.01); *H01Q 1/243* (2013.01); *H01Q 13/10* (2013.01);
(Continued)

(58) Field of Classification Search
CPC ..... H04M 1/0202; H01Q 1/243; H01Q 13/10; H01Q 5/35; H01Q 5/357; H01Q 1/44; H04B 1/3833; H04W 88/02
See application file for complete search history.

(56) References Cited

U.S. PATENT DOCUMENTS

| | | | |
|---|---|---|---|
| 2008/0074329 A1* | 3/2008 | Caballero | H01Q 1/088 343/702 |
| 2010/0073242 A1* | 3/2010 | Ayala Vazquez | H01Q 1/2266 343/702 |

(Continued)

FOREIGN PATENT DOCUMENTS

| | | |
|---|---|---|
| JP | 5712361 | 5/2015 |
| KR | 1020080063506 | 7/2008 |
| KR | 1020180024674 | 3/2018 |

OTHER PUBLICATIONS

U.S. Appl. No. 16/022,512, Office Action dated Sep. 12, 2018, 19 pages.

(Continued)

*Primary Examiner* — Barry W Taylor
(74) *Attorney, Agent, or Firm* — Lee, Hong, Degerman, Kang & Waimey

(57) ABSTRACT

There is disclosed a mobile terminal including: a display; a middle frame including a supporting portion and a side portion provided around the supporting portion to define a lateral external appearance; a main board including a ground; a first wireless communication unit configured to transceive a first signal; a second wireless communication unit configured to transceive a second signal; and a rear case configured to cover a rear surface of the main board, wherein the side portion includes a plurality of conductive members of which ends are divided into slits, and the plurality of the conductive members includes a common antenna electrically connectable with the first wireless communication unit (Continued)

and the second wireless communication unit and configured to receive the first signal and the second signal; and an independent antenna electrically connectable with the first wireless communication unit and configured to receive the first signal.

20 Claims, 12 Drawing Sheets

Related U.S. Application Data

(60) Provisional application No. 62/653,550, filed on Apr. 5, 2018.

(51) Int. Cl.
| | | |
|---|---|---|
| *H04B 1/3827* | (2015.01) | |
| *H01Q 13/10* | (2006.01) | |
| *H01Q 1/24* | (2006.01) | |
| *H01Q 5/357* | (2015.01) | |
| *H01Q 21/28* | (2006.01) | |
| *H01Q 5/35* | (2015.01) | |
| *H01Q 1/44* | (2006.01) | |
| *H04W 88/02* | (2009.01) | |

(52) U.S. Cl.
CPC ............ *H04B 1/3833* (2013.01); *H01Q 1/44* (2013.01); *H01Q 5/35* (2015.01); *H01Q 5/357* (2015.01); *H01Q 21/28* (2013.01); *H04W 88/02* (2013.01)

(56) References Cited

U.S. PATENT DOCUMENTS

| | | | |
|---|---|---|---|
| 2012/0176278 A1* | 7/2012 | Merz | H01Q 1/243 343/702 |
| 2012/0206302 A1* | 8/2012 | Ramachandran | H01Q 1/24 343/702 |
| 2013/0257659 A1* | 10/2013 | Darnell | H01Q 1/243 343/702 |
| 2013/0265938 A1 | 10/2013 | Jain et al. | |
| 2015/0036656 A1 | 2/2015 | McCarthy et al. | |
| 2015/0155614 A1 | 6/2015 | Youn et al. | |
| 2015/0249485 A1* | 9/2015 | Ouyang | H04B 5/0081 455/41.1 |
| 2016/0119942 A1 | 4/2016 | Wang | |
| 2017/0201010 A1 | 7/2017 | Kim et al. | |
| 2017/0324150 A1* | 11/2017 | Liu | H01Q 1/52 |
| 2018/0026334 A1 | 1/2018 | Chen et al. | |
| 2018/0026337 A1 | 1/2018 | Chen et al. | |

OTHER PUBLICATIONS

PCT International Application No. PCT/KR2018/007330, Notification of Transmittal of the International Search Report and the Written Opinion of the International Searching Authority, or Declaration dated Dec. 27, 2018, 9 pages.

European Patent Office Application Serial No. 18181094.6, Search Report dated Jan. 29, 2019, 8 pages.

Korean Intellectual Property Office Application No. 10-2018-0051314, Office Action dated Jun. 10, 2019, 5 pages.

\* cited by examiner (a)

(b)

(a)

(b)

(a)

(b)

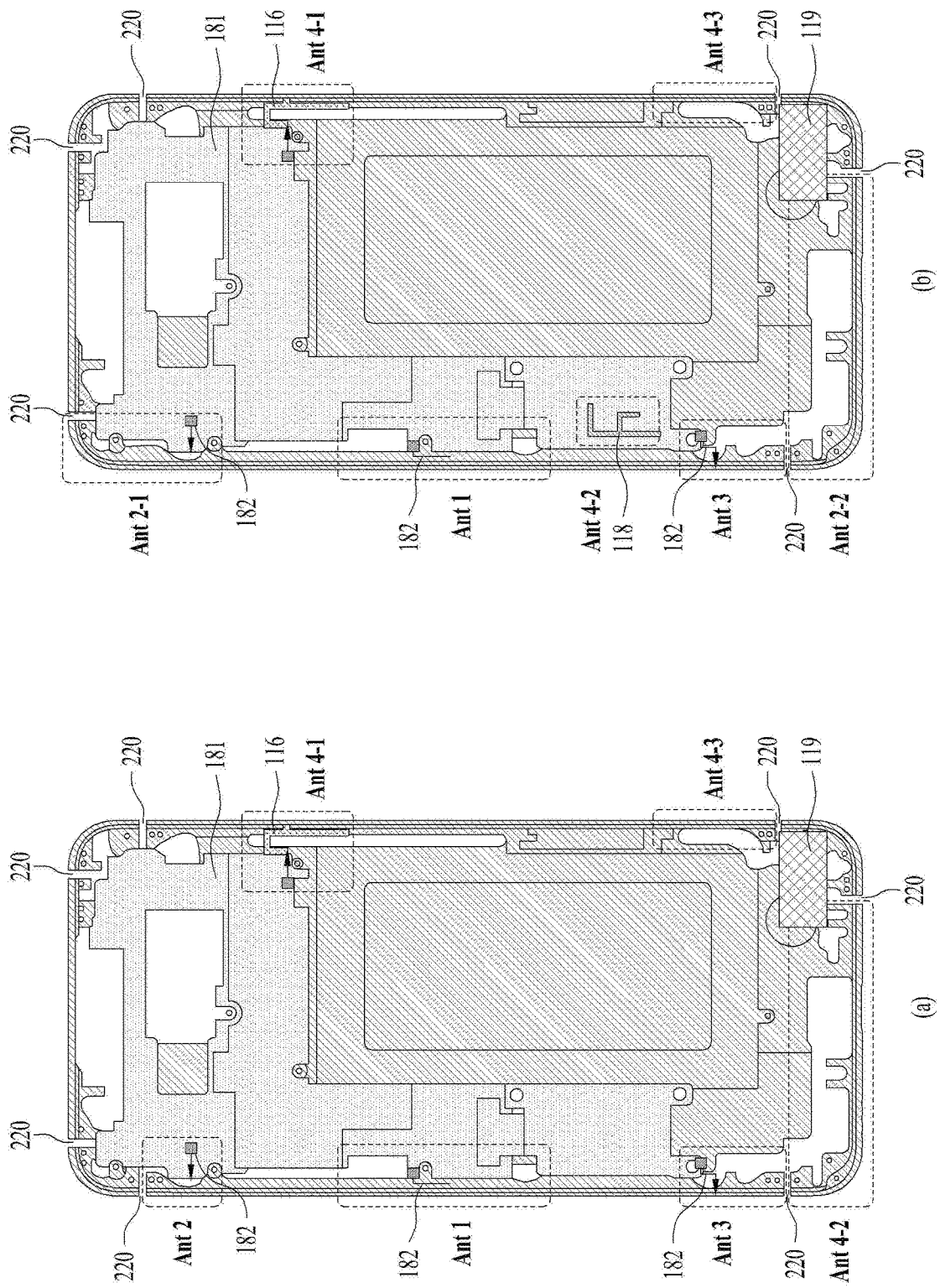

MOBILE TERMINAL

CROSS-REFERENCE TO RELATED APPLICATIONS

This application is a continuation of U.S. patent application Ser. No. 16/022,512, filed on Jun. 28, 2018, now U.S. Pat. No. 10,306,029, which claims the benefit of U.S. Provisional Application No. 62/653,550, filed on Apr. 5, 2018, and also claims the benefit of earlier filing date and right of priority to Korean Patent Application No. 10-2018-0051314, filed on May 3, 2018, the contents of which are all hereby incorporated by reference herein in their entireties.

BACKGROUND OF THE DISCLOSURE

Field of the Disclosure

Embodiments of the present disclosure relate to a mobile terminal including an antenna which may be used in 5th generation mobile communication.

Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

With such the diversified and expanded functions of the mobile terminal, diverse wireless communication methods are applied to the mobile terminal to facilitate exchange of data wirelessly. The mobile terminal having the diversified functions facilitates the appreciation of UHD image quality files or the use of virtual reality contents via a mobile communication network. Accordingly, there are increasing demands for a technique configured to transceive more data more rapidly.

As a result, there was the advent LTE (Long Term Evolution) communication for transceiving mass data rapidly and such LTE communication has advanced into new techniques having 2× faster transfer speeds such as LTE-A and integrated LTE or the like. To enhance the transfer speeds, two or more frequency bands are used or the frequency bandwidth is increased so as to increase the data transmission amount. The number of the antennas is increased to increase the frequency bandwidth or use signals in different frequency bands at the same time.

There is a limit to the increase of bandwidths or the use of signals in two or more bands. Accordingly, 5th generation mobile communication technique has emerged the 5G mobile communication is advantageous in transceiving mass data and has a fast responding speed, compared with the conventional 4G mobile communication. The 5G mobile communication uses a higher frequency band signal than the 4G mobile communication so that it may requires a totally different type of an antenna.

SUMMARY OF THE DISCLOSURE

Accordingly, an object of the present invention is to address the above-noted and other problems and provide a mobile terminal which includes an antenna for transceiving a signal which will be used in $5^{th}$ generation mobile communication, together with the a conventional LTE antenna.

Embodiments of the present disclosure may provide a mobile terminal comprising: a display unit; a middle frame comprising a supporting unit which supports a rear surface of the display unit and a side portion provided around the supporting portion to define a lateral external appearance; a main board provided in a rear surface of the middle frame and comprising a ground; a first wireless communication unit loaded in the main board and configured to transceive a first signal; a second wireless communication unit loaded in the main board and configured to transceive a second signal; and a rear case configured to cover a rear surface of the main board, wherein the side portion comprises a plurality of conductive members of which ends are divided into slits, and the plurality of the conductive members comprises a common antenna which is electrically connectable with the first wireless communication unit and the second wireless communication unit and configured to receive the first signal and the second signal; and an independent antenna which is electrically connectable with the first wireless communication unit and configured to receive the first signal.

The mobile terminal may further comprise a top button inserted in the side portion; a button gap formed by the side portion having the top button inserted therein and the supporting portion spaced apart from the side portion; a switch substrate provided in the button gap and configured to generate a signal when the top button is pressed; and a pattern antenna having at least predetermined area which is overlapped with the button gap and configured to receive the first signal, when electrically connected with the first wireless communication unit.

The pattern antenna may be connected and grounded with the middle frame.

The pattern antenna may be formed in an inner surface of the rear case.

The length of the pattern antenna may be corresponding to one fourth of the wavelength of the first signal.

The independent antenna may form a closed slot antenna having two closed ends configured of one end connected with the supporting portion and the other end connected with the supporting portion or the ground of the main board, the closed slot antenna electrically connected with the second wireless communication unit between a first point and a second point and configured to receive the first signal.

The independent antenna may be arranged in a left lateral surface or a right lateral surface of the mobile terminal, and the length of the independent antenna may be corresponding to one half of the wavelength of the first signal.

The independent antenna may form an open slot antenna having one end connected with the supporting portion and the other end provided in the slit, together with the supporting portion.

The length of the slot antenna may be corresponding to one fourth of the wavelength of the first signal.

Two slot antennas may be arranged in a lateral direction of the mobile terminal side by side.

The mobile terminal may further comprise a non-conductive molding material disposed between the conductive member and the supporting portion; a feeding line connected with the first wireless communication unit or the second wireless communication unit and configured to feed the conductive member; and a connection clip inserted in the non-conductive molding material and comprising one end contacting the conductive member and the other end contacting with the feeding line.

The mobile terminal may further comprise a non-conductive molding material disposed between the conductive member and the supporting portion; and a feeding line connected with the first wireless communication unit or the second wireless communication unit and comprising one end contacting with the non-conductive molding material, the feeding line configured to feed the conductive member by a coupling method.

The side portion comprises an open portion of which at least predetermined area is omitted; and an array antenna arranged adjacent to the open portion.

The mobile terminal may further comprise a space formed between the display unit and a lower end of the middle frame; and an array antenna arranged adjacent to the space.

The common antenna may be configured to receive the first signal, and one of the independent antennas is configured to transmit and receive the first signal.

The first signal may be a NR (New Radio) signal, and the second signal may be an LTE (Long Term Evolution) signal.

The first signal may have a frequency of 2.5 GHz or more and 6 GHz or less, and the second signal may have a frequency of 2.7 GHz or less.

The slit may be provided in at least one end of the common antenna.

At least four slits may be provided.

The common antenna may have two or more resonance frequencies.

According to the embodiment of the present disclosure, the mobile terminal has following effects. The mobile terminal in accordance with the present disclosure may include the common antenna which is connectable with the two or more wireless communication units in the limited area and configured to receive the different signals. Accordingly, the antennas for the LTE communication and the 5G communication may be arranged in the limited space.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIGS. 7, 8 and 10 are diagrams illustrating a further embodiment of the antenna embodiment;

DESCRIPTION OF SPECIFIC EMBODIMENTS

Figure 1A:
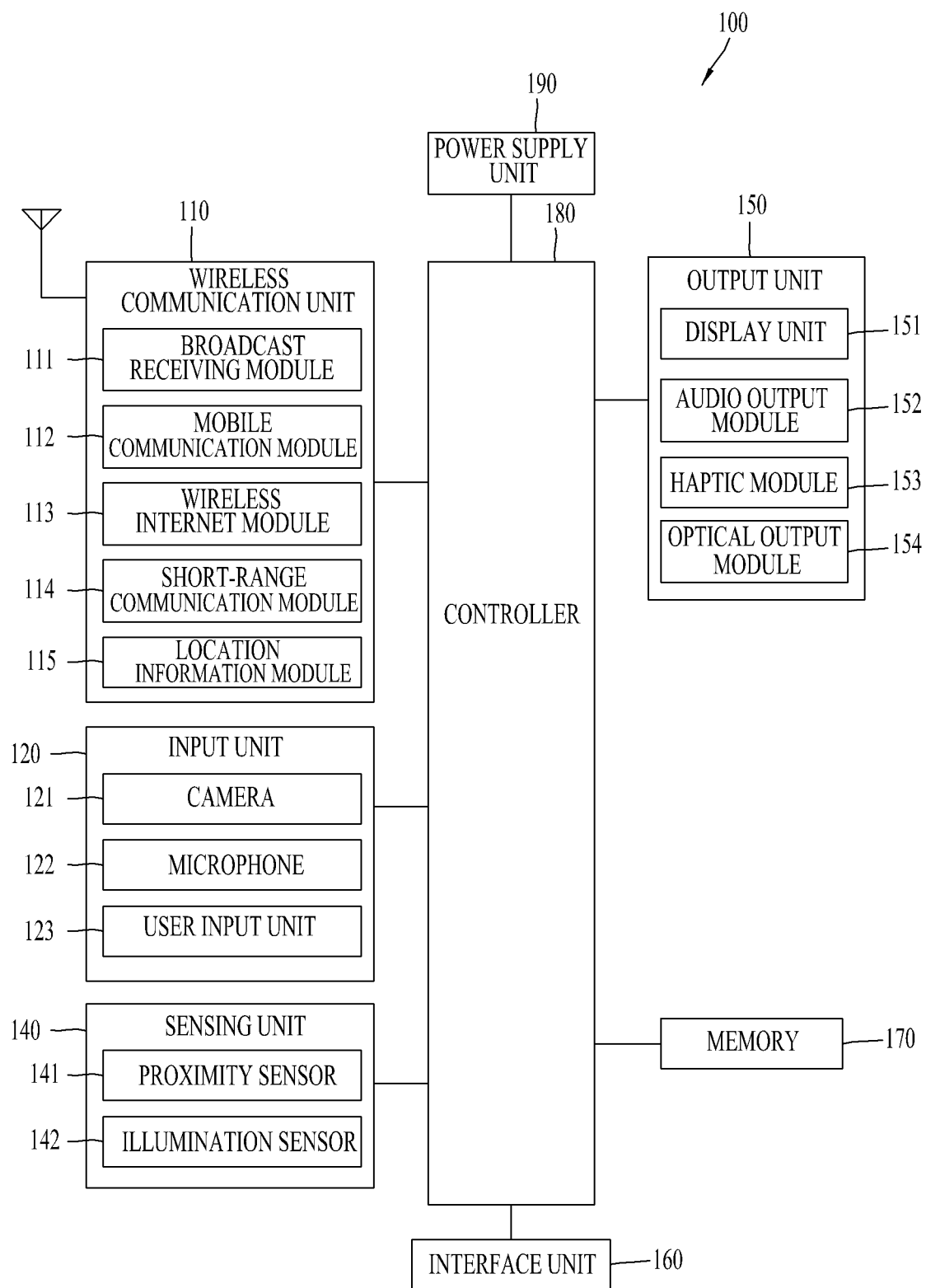
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
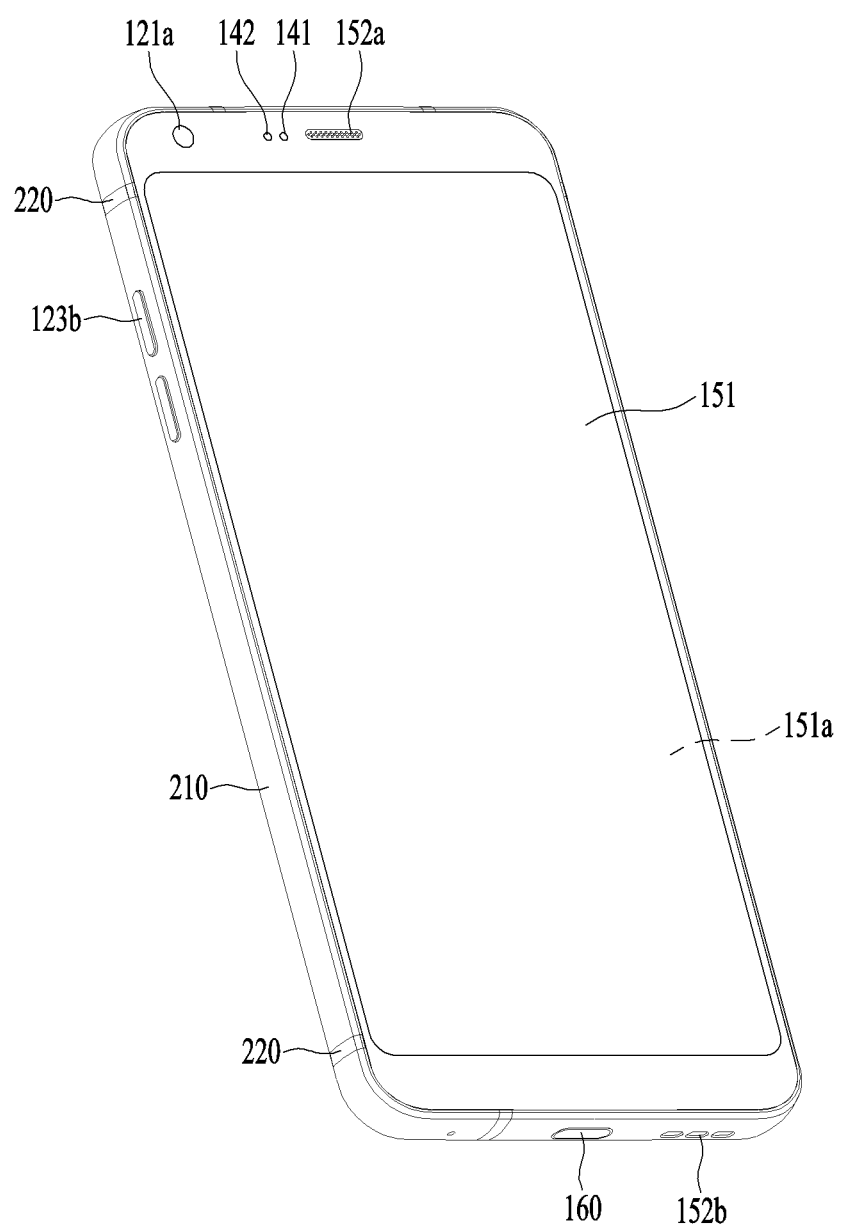
FIGS. 1B and 1C are conceptual views of one example of the mobile terminal, viewed from different directions.
Figure 1C:
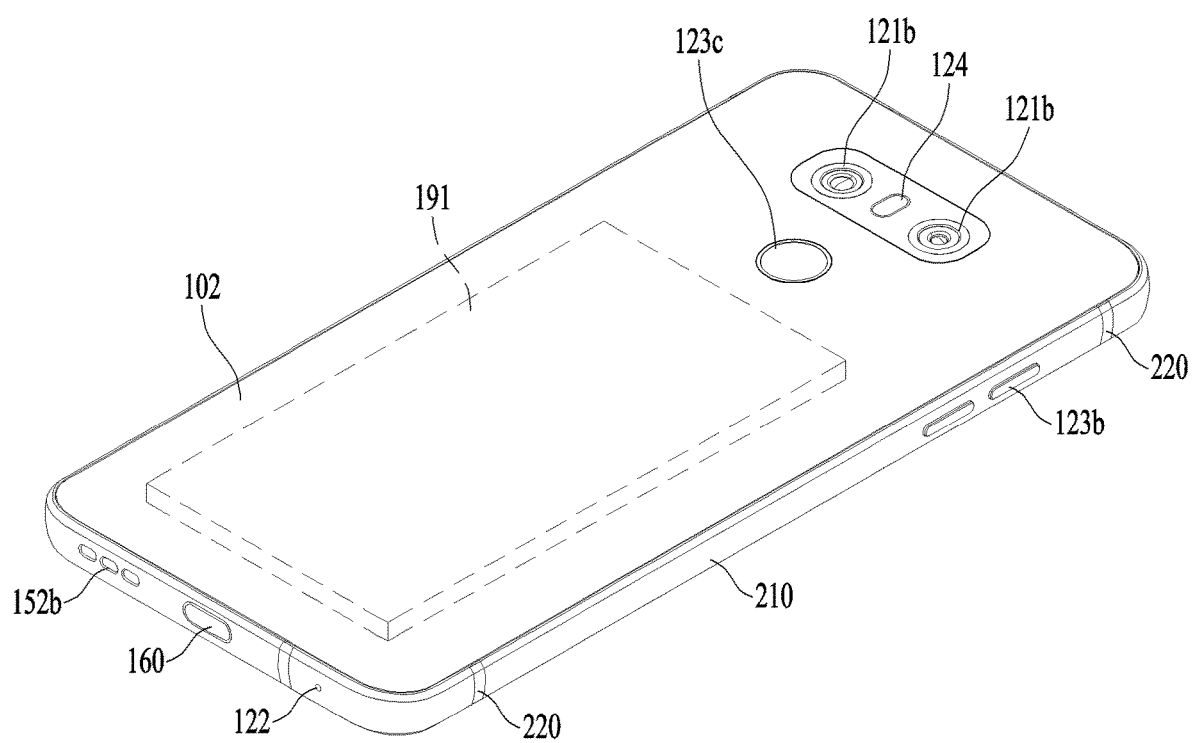

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components in FIG. 1A is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Hereinafter, referring to FIG. 1A, the components mentioned above will be described in detail before describing the various embodiments which are realized by the mobile terminal 100 in accordance with the present disclosure.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 may be provided with the power supplied by an external power source and the power supplied therein under the control of the controller 180 so as to supply the needed power to each of the components. The power supply unit 190 may include a battery. The battery may be a built-in type which is rechargeable and detachably loaded in the terminal to be charged.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body may be understood to refer to the concept of this bore a mobile terminal (100) to at least one of the aggregate.

The mobile terminal 100 will generally include a case (for example, frame, housing, cover, and the like) forming the appearance of the terminal.

As shown in the drawing, there is a recent advent of a mobile terminal including a window 151a which is disposed on a front surface of the display unit may cover the overall front area, while including no front case. Such a mobile terminal may include a side case 210 formed to cover a lateral side. The window 151a, the side case 210 and the rear case 102 may form an inner space. As occasion occurs, some electronic components may be loaded even in the rear case 102. The electronic components which can be loaded in the rear case 102 may include a removable battery, an identity module, a memory card and the like. In this instance, a rear cover for covering the loaded electronic components may be detachably coupled to the rear case 102. Accordingly, when the rear cover is decoupled from the rear case 102, the electronic components loaded in the rear case 102 will be exposed outside.

Synthetic resin or metal is injected in a mold to fabricate such the cases 102 and examples of the metal include stainless steel (STS), aluminum (Al) and the like.

The side case 210 in accordance with the embodiments of the present disclosure may include metal and it may be used as an antenna radiator. Such the metal useable as the antenna radiator has to be a conductive material having a preset length which is proper to characteristics of a frequency for a transceived signal. accordingly, a middle area of the side case 210 made of the metal is partitioned off by a slit 220 to form a plurality of conductive members and a non-metallic material is filled in the slits 220 to use the conductive members as the antenna radiator.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the rear case 102 to hermetically seal an inner space when those cases are coupled.

The mobile terminal 100 may include the display unit 151, the audio output module, the proximity sensor 141, the illuminance sensor 142, the optical output module 154, the camera 121, the user input unit 123, the microphone 122 and the interface unit 160.

It will be described for the mobile terminal as shown in FIGS. 1B and 1C. The display unit 151, the first audio output module 152a, the proximity sensor 141, an illumination sensor 142, the optical output module 154 and the first camera 121a are arranged in front surface of the terminal body, the second manipulation unit 123b, the microphone 122 and interface unit 160 are arranged in side surface of the terminal body, and the second audio output modules 152b and the second camera 121b are arranged in rear surface of the terminal body.

It is to be understood that alternative arrangements are possible and within the teachings of the instant disclosure. Some components may be omitted or rearranged. For example, the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of a first manipulation unit (not shown) placed at a front surface of the terminal body.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies. In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first manipulation unit and the second manipulation unit 123b are examples of the user input unit 123, which may be manipulated by a user to provide input to the mobile terminal 100. The first manipulation unit and the second manipulation unit 123b may also be commonly referred to as a manipulating portion, and may employ any tactile method that allows the user to perform manipulation such as touch, push, scroll, or the like. The first manipulation unit and the second manipulation unit 123b may also employ any non-tactile method that allows the user to perform manipulation such as proximity touch, hovering, or the like.

FIG. 1B illustrates the second manipulation unit 123b as a touch key, but possible alternatives include a mechanical key, a push key, a touch key, and combinations thereof.

Input received at the first manipulation unit and the second manipulation unit 123b may be used in various ways. For example, the first manipulation unit may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (123c) may be located on the rear surface of the terminal body. The rear input unit 123c can be manipulated by a user to provide input to the mobile terminal 100. The input may be used in a variety of different ways. For example, the rear input unit 123c may be used by the user to provide an input for power on/off, start, end, scroll, control volume level being output from the first or second audio output modules 152a or 152b, switch to a touch recognition mode of the display unit 151, and the like. The rear input unit 123c may be configured to permit touch input, a push input, or combinations thereof.

The rear input unit 123c may be located to overlap the display unit 151 of the front side in a thickness direction of the terminal body. As one example, the rear input unit 123c may be located on an upper end portion of the rear side of the terminal body such that a user can easily manipulate it using a forefinger when the user grabs the terminal body with one hand. Alternatively, the rear input unit 123c can be positioned at most any location of the rear side of the terminal body.

Embodiments that include the rear input unit 123c may implement some or all of the functionality of the first manipulation unit in the rear input unit 123c. As such, in situations where the first manipulation unit is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown located adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A) may be retractable into the terminal body. Alternatively, an antenna may be formed using a film attached to an inner surface of the rear case 102, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

An accessory for protecting an appearance or assisting or extending the functions of the mobile terminal 100 can be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, embodiments which are associated with a control method which may be realized in the mobile terminal having the structure mentioned above will be described in reference to the accompanying drawings. In the present disclosure, that which is well-known to one of ordinary skill in the relevant art has generally been omitted for the sake of brevity.

As the multimedia function becomes important, the wireless communication technique may be performed in the mobile terminal 100 in various methods. For example, the wireless communication is performed in a short or long range or between devices. At this time, the frequency bands used in this instance are different and different antennas have to be used.

LTE which is one of the $4^{th}$ generation mobile communications has emerged to support the transceiving of mass data. However, considering a trend of a wireless network user's data consumption and wide availability of Io T (Internet of Things), there are demands for new ultra-broadband mobile communication technique for transceiving mass data faster than LTE. $5^{th}$ generation mobile terminal communication techniques are under development and RF techniques for $5^{th}$ generation (5G) mobile communication is referred to as 'NR (New Radio)' in 3GPP ($3^{rd}$ Generation Partnership Project) and 'IMT (International Mobile Telecommunication)-2020' in ITU (International Telecommunications Union), which is a communication method realized in a different way from conventional LTE.

Such 5G mobile communication facilitates fast transmission of mass data and improvement of data transmission reliability. With wide-spreading of Io T (Internet of Things), the 5G mobile communication may further include a function of Io T communication supporting.

5G is a mobile communication technique of which the maximum download and the minimum download speed are 20 Gps and 100 Mbps. Also, 5G may provide 1,000,000 devices within a 1 $km^2$ with the IoT service and facilitate free communication even in a high-speed train at the speed of 500 km/h. The download speed of 5G is 280 times faster than that of the conventional LTE, which allows a user to download a 1 GB movie in 10 seconds.

The 5G mobile communication has a remarkably improved response speed, as well as the transmission speed. When the data transmission speed shows how much data passes at once, the response speed shows how long it takes for little data to go.

The response speed of 4G becomes as fast even as 10~50ms (millisecond, one thousandth second). The response speed of 5G becomes about 10 times faster than that of 4G. Accordingly, 5G is expected to be introduced in such fields as self-driving cars and IoT which have to transceive mass data with a central sever constantly.

5G may use frequency bands of centimeter waves (3 GHz~30 GHz) and millimeter waves (30 GHz~300 GHz). Especially, a communication method which uses signals at a frequency band of 6 GHz or less is referred to as 'Sub-6'.

Sub-6 includes N41 which uses signals at a frequency band from 2.5 GHz to 2.7 HGz and N78 which uses signals at a frequency band from 3.3 GHz to 3.8 GHz. Every country uses a different frequency band. It is necessary to provide an antenna which is capable of securing the performance in both frequency bands for the products which can be used worldwide.

Figure 2:
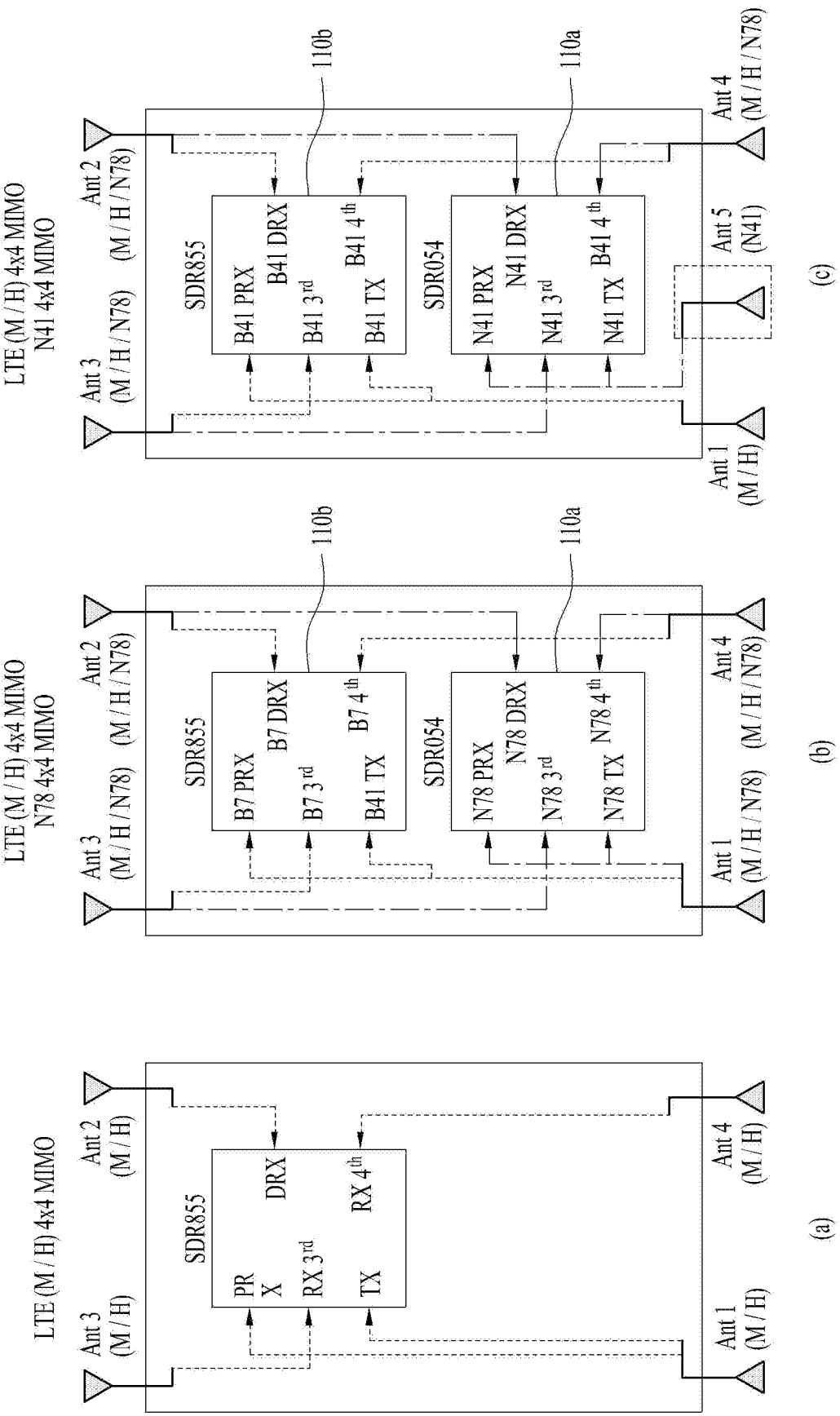
FIG. 2 is a diagram to describe arrangement of an LTE antenna and an NR antenna which are provided in the mobile terminal in accordance with the present disclosure.

FIG. 2 is a diagram to describe the arrangement of an LTE antenna and a $5^{th}$ generation (5G) antenna in the mobile terminal. A conventional LTE antenna happens to have a complex structure after several structural improvements. There are increasing demands for an antenna structure configured to expand a bandwidth in a resonance frequency for broadband LTE. More specifically, it is necessary to provide a plurality of antennas or a multi-resonant antenna which may receive different frequency band signals for LTE-A (LTE-Advanced) configured to use several frequency band signals, not one-frequency-band signals.

It is necessary to provide a plurality of antennas for covering signals in all of the bands including a frequency band of 1 GHz or less (Low band), a frequency band near 2 GHz (Mid band) and a frequency band of 2.2 GHz or more (High band).

It is also necessary to provide a plurality of antennas so as to apply MIMO (Multiple Input Output). When MIMO is applied, data is transmitted in several ways between a mobile terminal and a base station via two or more antennas provided in the mobile terminal and a receiving end detects the data such that interference may be reduced and the transmission speed of each data may be enhanced effectively. Accordingly, MIMO may transmit as much data as the number of the antennas. FIG. 2 (*a*) illustrates the structure of an antenna when 4×4 MIMO is applied for LTE mobile communication. For that, four antennas are required and such four antennas may perform data-receiving (Rx.). However, there may be provided one antenna which is able to perform data-transmitting.

Typically, the antennas for the data-transmitting may be arranged in the areas which can minimize interference with other electronic components, because they are more sensitive to interference than the antenna for the data-transmitting. Also, the antennas are electrically connected with a wireless communication unit for LTE communication and able to transmit or receive signals corresponding to the resonance frequencies of the antennas, respectively.

Four or more antennas for such improved LTE mobile communication are provided and an antenna for wireless communication such as WIFI, Bluetooth and GPS may be further provided.

Even when a mobile communication method for 5G mobile communication is utilized, the equipment for 5G communication has established little and the region where 5G communication is facilitated is restricted and the conventional terminal is unable to perform 5G communication.

Because of that, a telecommunication company provides a mobile communication service which uses both LTE and 5G and requires mobile terminals which are able to use such two methods.

FIG. 2 (b) is a conceptual diagram of the mobile terminal which further includes an antenna and a wireless communication unit so as to use a N78 signals rather than the structure shown in FIG. 2 (a). The mobile terminal includes a first wireless communication unit 110a for 5G wireless communication; and a second wireless communication unit 110b for LTE wireless communication. The first wireless communication unit 110a and the second wireless communication unit 110b may be loaded on the main board 181 as a chipset. For the connection between the antennas and the wireless communication units 110a and 110b, the circuit loaded on the main board 181 and the signal line connected with the main board 181 may be used.

N78 uses signals in approximately 3.5 HGz band, which means that N78 uses signals in a different band, compared with LTE. Accordingly, there is little mutual interference between the signals enough to facilitate 5G mobile communication and LTE communication, using one antenna. In other words, each of the antennas may be connected with the first wireless communication unit 110 and the second wireless communication unit 110b at the same time. The antenna connectable with the first and second wireless communication units 110a and 110b at the same time may be referred to as the common antenna. In this instance, an additional conductive pattern may be tuned to use two frequency bands.

FIG. 2 (c) illustrates the arrangement of the wireless communication and an antenna so as to perform wireless communication by using N41 signals via the antenna for LTE. The antenna in accordance with this embodiment includes five antennas, different from the above-noted embodiment. The mobile terminal may include a first wireless communication 110a for 5G wireless communication; a second wireless communication unit 110b for LTE communication; three antennas which are connectable with the first and second wireless communication units 110a and 110b at the same time; one antenna which is connectable only with the first wireless communication unit 110a; and another antenna which is connectable only with the second wireless communication unit 110b.

The N41 signal uses a band of 2.7 GHz such that there might be an overlapped section with a signal in B41 band of 2.5 GHz for LTE enough to cause interference. A receiving antenna may be used for both the N41 band signal and the B41 band signal. In contrast, such interference might cause an error in a transmitting antenna. Accordingly, an independent antenna which is connectable only with the first wireless communication unit 110a may be provided. For easy description, the signal used for wireless communication by the first wireless communication unit 110a may be referred to as the first signal (5G signal) and the signal used for wireless communication by the second wireless communication unit 110b as the second signal (LTE signal).

Figure 3:
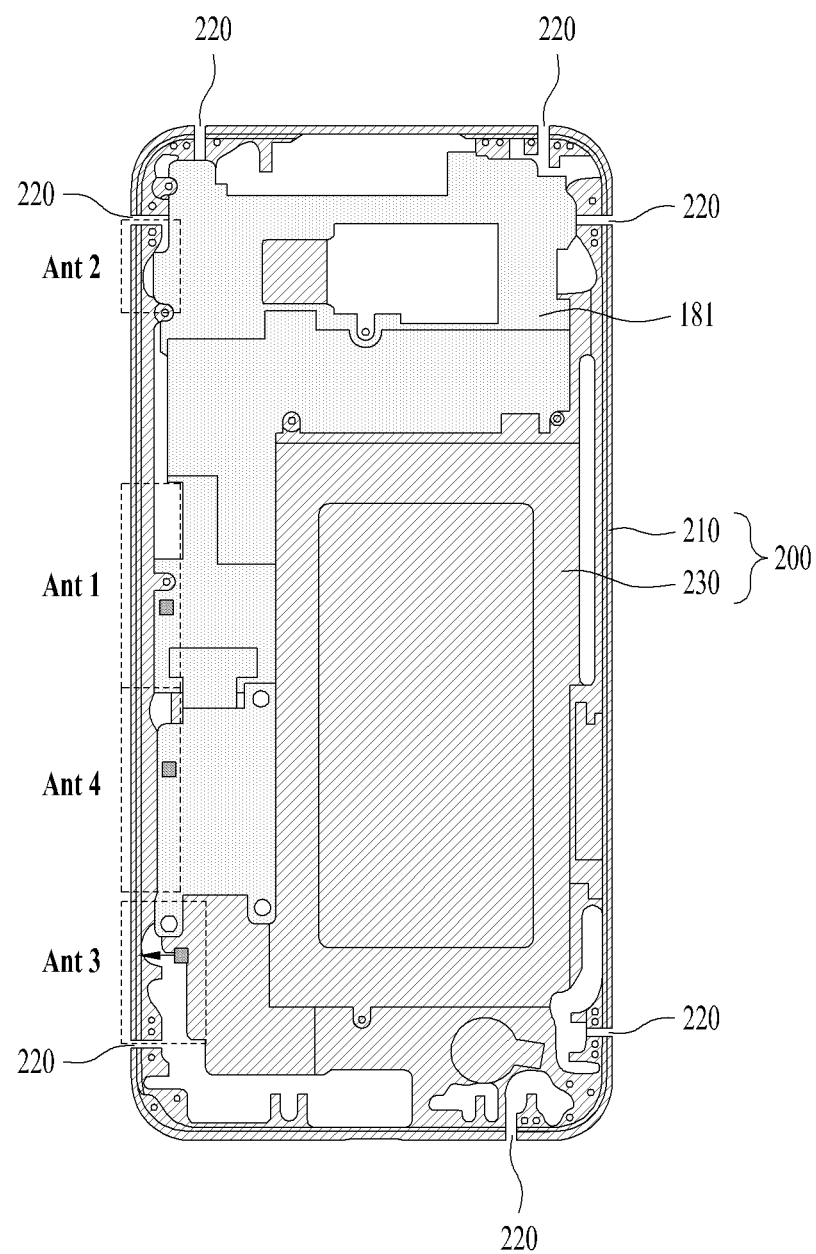
FIG. 3 is a diagram illustrating one embodiment of the arrangement of antennas which are provided in the mobile terminal.

Hereinafter, the antennas applied to the actual mobile terminal will be descried in detail. FIG. 3 is a diagram illustrating one embodiment of the arrangement of antennas which are provided in the mobile terminal 100. It is shown that the antenna is connected with the first wireless communication 110a.

Diverse electronic components are loaded in the limited inner space of the mobile terminal 100 such that such the inner space should be divided and used. The battery which occupies the largest volume of the inner space may be arranged in a predetermined portion of the inner space and the other components including the main board 181, the camera 121, the audio output unit 152, the interface unit 160 and the like may be loaded in the other space.

In recent, a design realized by using metal is applied to a side case 210 which defines lateral surfaces of the mobile terminal. The lateral structure of the side case 210 realized by using metal is good in terms of design. However, the internal electronic components of the mobile terminal 100 may be surrounded by the metal case and the wireless communication performance of the antenna provided as the device using electromagnetic waves, especially, might be deteriorated by the metal case.

When solving the disadvantage, the metal side case of the mobile terminal may be used as the antenna in terms of the space for the antenna arrangement. As shown in FIG. 3, the mobile terminal may further include a middle frame 200. The middle frame 200 may include a supporting portion 230 provided on a rear surface of the display unit 150 in the mobile terminal and configured to support the display unit 151 and reinforce the strength and rigidity of the mobile terminal 100; and a side portion 210 integrally formed with the supporting portion 230. In other words, the side case and the supporting portion arranged in the rear surface of the display unit are integrally formed as one body.

The middle frame 200 may have a conductive material such as magnesium or aluminum or the like and a predetermined rigidity strong enough to reinforce the strength and rigidity of the mobile terminal 100. The supporting unit 230 may be the largest conductive element in the mobile terminal and then employed as a ground. Accordingly, the grounding may be facilitated via the supporting unit 230. The side portion 210 may be spaced a preset distance from the supporting portion 230 and partially connected with the supporting portion 230. To use the side portion 210 as the antenna, the side portion 210 may be divided into slits 220 as a plurality of conductive members. Such conductive members may be connected and grounded to a ground of the main board 181 and used as antennas which are supplied the electric power via a power supply line (182, see FIG. 4).

It is necessary to provide several conductive members so as to realize the plurality of antennas configured to transceiving the first signal and the second signal. Accordingly, four or more slits may be provided.

The antenna has to be formed a half or a fourth times longer than the frequency of the communication signal so as to resonate with a signal desired to receive. Ends of the antenna may be connected with the supporting portion 230 or the ground to be grounded or divided by the slits 220. When connected with the supporting portion 230 or the ground of the main board 181, both ends of the antenna are grounded only to realize a closed slot antenna. When one end is grounded and the other end of the antenna is open by the slot 220, an open slot antenna may be realized.

The closed slot antenna may have a corresponding length to one half of the wavelength of the signal desired to receive and the open slot antenna may have a corresponding length to one fourth of the wavelength. The open slot antenna may be shorter than the closed slot antenna and it has the open end which allows frequency tuning. Accordingly, the closed slot antenna may easily realize the antenna having a multi-resonance frequency.

The side portion 210 may functionally serve as the antenna but it defines some part of the exterior appearance of the mobile terminal only to be restricted in terms of design. Considering the wavelength of the received signal, it is difficult to form the slit freely and the number of the slits 220 is limited in terms of design. The side portion 210 of the mobile terminal shown in FIG. 3 includes two slits 220 provided in an upper area; two slits provided in a lower area; and one slit 220 provided in a lateral area. The space and the slits 220 between the side portion 210 and the supporting portion 230 may be filled with an injection-molded material 240 which is a non-conductive material.

The mobile terminal in accordance with this embodiment shown in the drawing includes an independent antenna connected only with the first wireless communication unit 110a; and a common antenna connected with the first wireless communication unit 110a and the second wireless communication unit 110b simultaneously. As the conventional antenna for LTE communication is arranged in the upper and lower end areas of the mobile terminal, independent antennas (Ant1, Ant2, Ant3 and Ant4) may be further formed in a lateral area of the mobile terminal 100.

Figure 4:
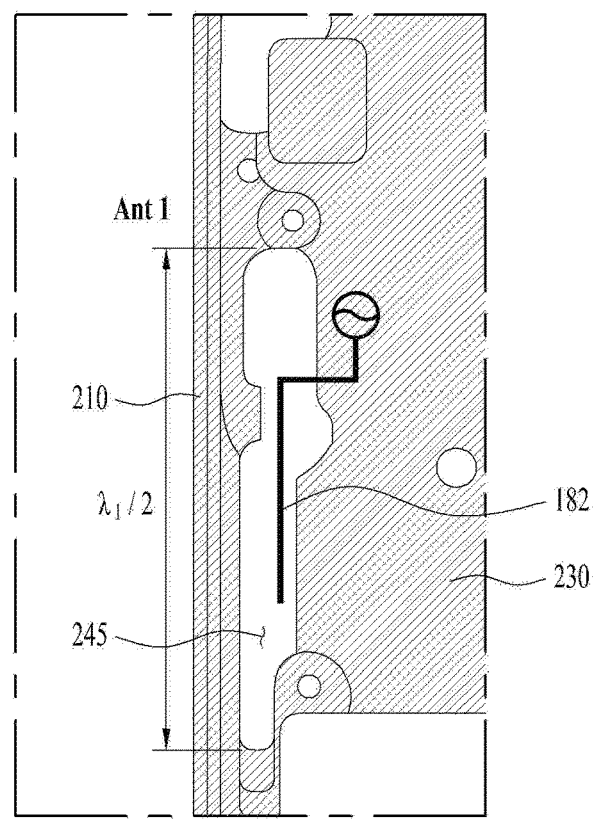
FIG. 4 is a diagram illustrating one embodiment of an independent antenna provided in the mobile terminal.
Figure 4:
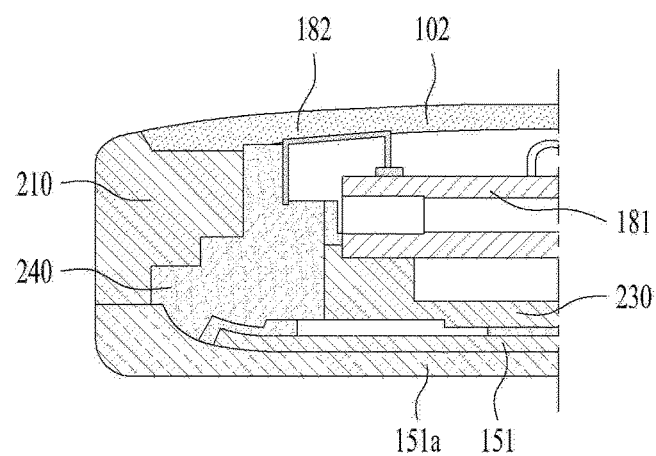

FIG. 4 is a diagram illustrating one embodiment of the independent antenna provided in the mobile terminal 100. FIG. 4 (a) is a conceptual diagram to describe the arrangement of a feeding line 182 electrically connected with the middle frame 200 and the first antenna (Ant1). FIG. 4 (b) is a sectional diagram of the first antenna (Ant1).

Referring to FIG. 4 (a), the first antenna (Ant1) of the illustrated embodiment is the closed slot antenna. The length of the closed slot antenna may be one half of the wavelength (λ) of the received signal. The length of the closed slot antenna may be differentiated according to the effect of peripheral electronic components and the permittivity of the injection-molded material 240 filled in the slot 245 provided between the supporting portion 230 and the side portion 210.

The feeding line 182 of the first wireless communication unit 110a is spaced apart from the side portion 210 as shown in FIGS. 4 (a) and (b), not directly connected with the side portion 210, such that it may feed electricity in a coupling method. Even unless the feeding line 182 is directly connected with the first antenna (Ant1), the electric field formed by the feeding line 182 may allow electric currents to flow to the first antenna (Ant1) to supply the electric power. The length of the closed slot antenna is not precisely divided and the closed clot antenna can perform more stable wireless communication than the open slot antenna such that it can use the coupling type feeding.

As shown in FIG. 4 (b), the coupling type feeding line may be arranged in contact with an inner surface of the injection-molded material 240 filled in the slots and have no connection structure (e.g., a C-clip) for directly contacting with the side portion 210. Accordingly, it is easy to realize the coupling type feeding line and the coupling type may reduce the number of materials enough to secure the space easily.

The first wireless communication unit 110a of this embodiment may transceive a signal in N78 band (3.5 GHz band). The wavelength of the N78 band is shorter than that of the N41 band so that the antenna for the N78 band signal can be short. As shown in FIG. 3, two antennas (Ant1 and Ant4) may be arranged in one lateral area side by side.

Figure 5:
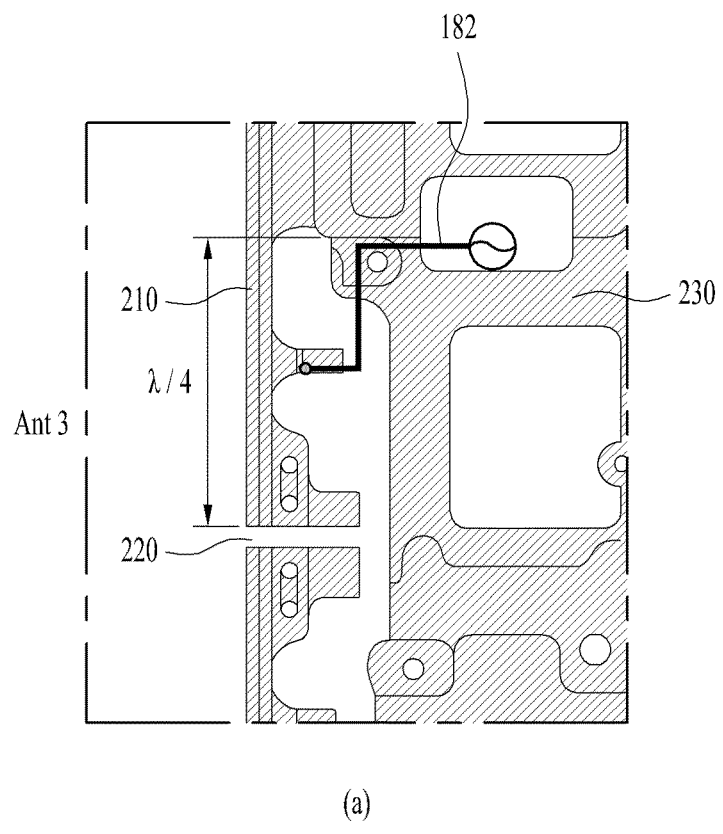
FIG. 5 is a diagram illustrating a common antenna of the mobile terminal.
Figure 5:
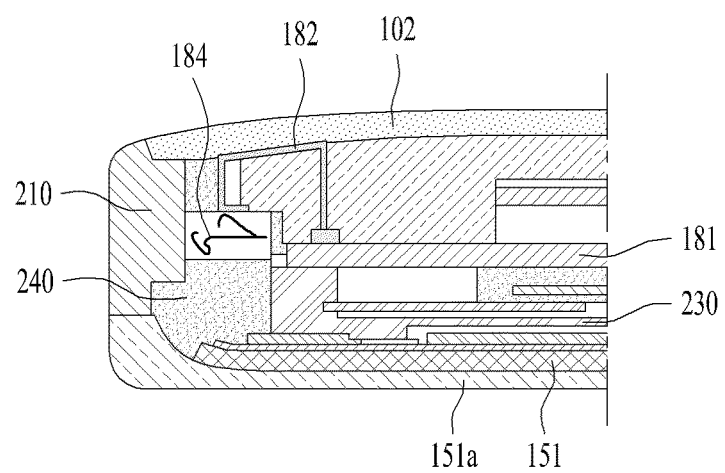

FIG. 5 is a diagram illustrating the independent antenna provided in the mobile terminal 100 and the independent antenna is corresponding to the third antenna (Ant3) of FIG. 3. The common antenna of this embodiment may be an open slot antenna having one end. As mentioned above, the open slot antenna is the antenna having the multi-resonance frequency and it is easy to tune the open slot antenna. The independent antenna may be the open slot antenna, in other words, the antenna having the slit 220 formed in the end. The antenna having the open end may be the antenna having a length corresponding to one fourth of the wavelength (λ) of a signal desired to receive. Accordingly, the open slot antenna has an advantage of a reduced loading space but a disadvantage of the effect on the exterior design, because the slit 220 has to be formed in the side portion 210. The open slot antenna may be limitedly formed in the area where the slit 220 is formed.

The stability of the open slot antenna is deteriorated, compared with the closed slot antenna, such that the open slot antenna may use a direct-feeding method configured to performing feeding via a conductor contacting with the side portion 210. As shown in FIG. 5 (b), a connection clip is mounted in an injection mold 240 and a conductive member of the side portion 210 may contact with the feeding line 182 via the connection clip 184.

The feeding line 182 for feeding the antenna may be realized by forming a pattern in the rear case 102 shown in FIGS. 5 (b) and 4 (b).

In the embodiment of FIG. 3, four slits 220 and three slits 220 are provided in the upper and lower areas of the mobile terminal 100, respectively, so as to divide the side portion 210 into several conductive members. Accordingly, the space where the side portion 210 is able to be used as the antenna may be increased and then one of the antennas may be realized as one common antenna may be provided, while the other ones may be realized as the independent antennas. Especially, the N78 band signal has a short wavelength and it is easy to secure the space for the antenna arrangement in the mobile terminal 100.

Figure 6:
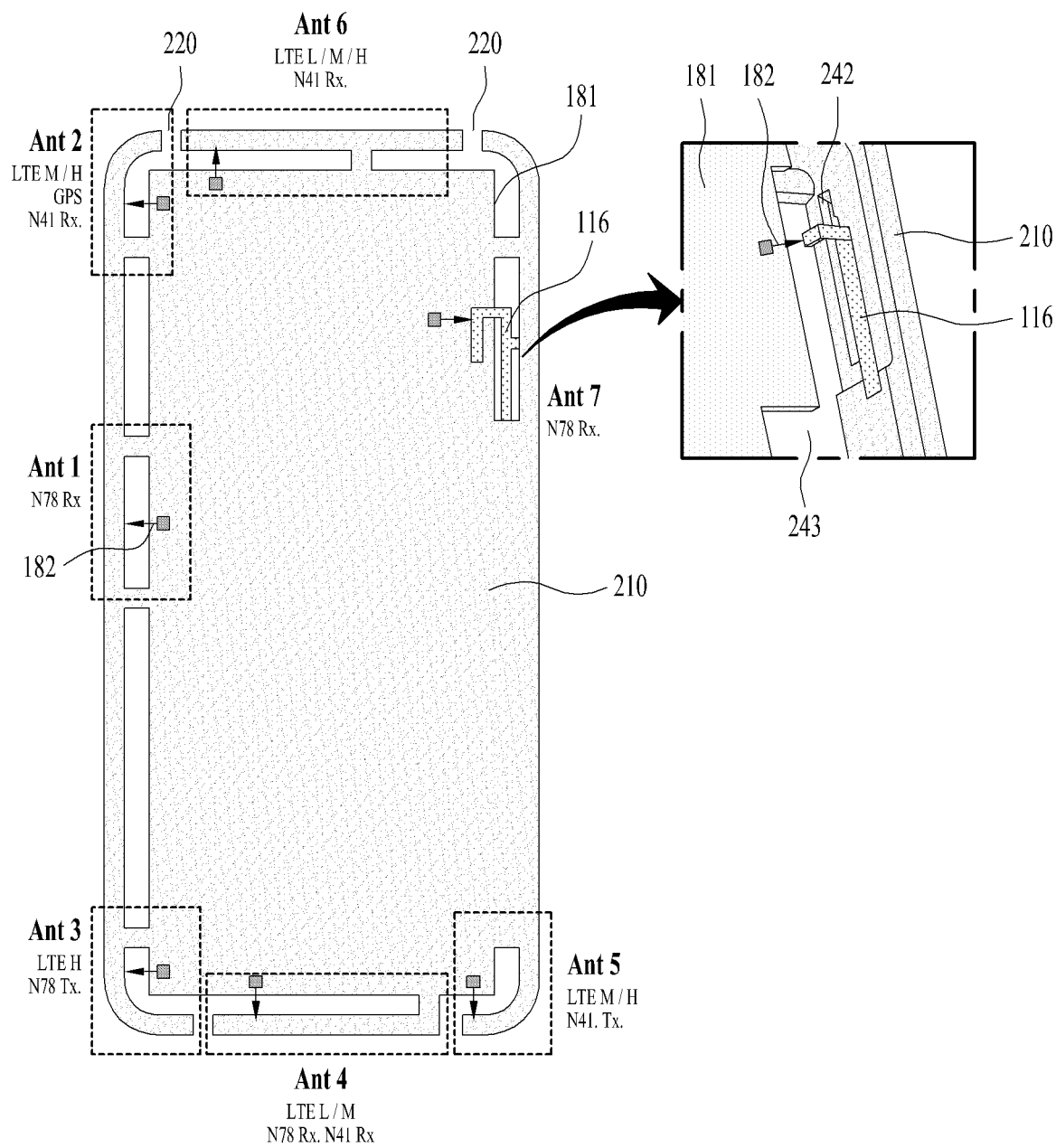
FIG. 6 is a diagram illustrating another embodiment of the arrangement of the antennas which are provided in the mobile terminal.

FIG. 6 is a diagram illustrating another embodiment of the arrangement of the antennas which are provided in the mobile terminal. According to this embodiment, the number of the slits 220 is smaller than that of the slits 220 according to the embodiment of FIG. 3 and the number of the side portions 210 usable as the antennas may be limited. Accordingly, the number of the common antennas for receiving both of the first and second signals may be more than that of the common antennas according to the embodiment of FIG. 3.

In the illustrated embodiment, the signal transceived by the first wireless communication unit 110 may include not only the N41 band signals but also the N78 band signals and then use the diverse bands, such that the number of the antennas connected with the first wireless communication unit 110a cannot be more than 4.

Referring to FIG. 6, the common antenna of this embodiment may include a second antenna (Ant2) through a sixth antenna (Ant2~Ant6). The common antennas may receive the first signal in the N41 band or the N78 band and transmit the received signal to the first wireless communication unit 110a. In addition, the common antenna may also receive the second signal and transmit the received second signal to the second communication unit 110b. The fifth antenna (Ant4) may not transmit a signal in an LTE B41 band so that it may be configured to transmit (Tx) the signal in the N41 band as well as the first signal.

In this embodiment, the only one first antenna (Ant1) is provided as the independent antenna and the number of the antennas for receiving the first signal is insufficient. Accordingly, this embodiment may further include a pattern antenna (Ant7) which is realized by forming a conductive pattern 116 for additionally realizing the antenna configured to receive the first signal.

Such a pattern antenna may be formed in an inner surface of the rear case 102 composing the mobile terminal 100 or it may be printed on an antenna carrier by using a conductive material or attached to a flexible substrate. One side of the conductive pattern 116 may be realized as IFA (Inverted F Antenna) which is connected with the middle frame 200 to be grounded with the feeding line 182. The pattern antenna may have a corresponding length to one fourth of the wavelength of the N78 band signal to receive the N78 band signal.

An open space without a surrounding conductive material has to be provided to allow the pattern antenna (Ant7) to receive the signal. The side portion 210 is provided in the lateral area of the mobile terminal 100 and the supporting portion 230 or the display unit 151 is provided in the front area of the mobile terminal. Because of that, the antenna radiation is difficult. To solve that, the pattern antenna (Ant7) of this embodiment uses the structure for the side button (123b, see FIG. 1B) provided in the lateral surface of the mobile terminal so as to realize the open space which is required to pass the signal there through.

The side button 123b may include a switch substrate configured of a top button exposed to the lateral surface; and a dome switch configured to generate a signal when the top button is pressed. The top button is inserted in a button hole 242 formed in the side portion 210 and a button gap 243 is formed between the side portion 210 and the supporting portion 230 to insert the switch substrate therein.

The button hole 242 is provided in a lateral direction of the pattern antenna (Ant7) and the button gap 243 is provided in a front direction of the pattern antenna (Ant7), only to secure the space in which the conductive material is partially removed.

Figure 7:
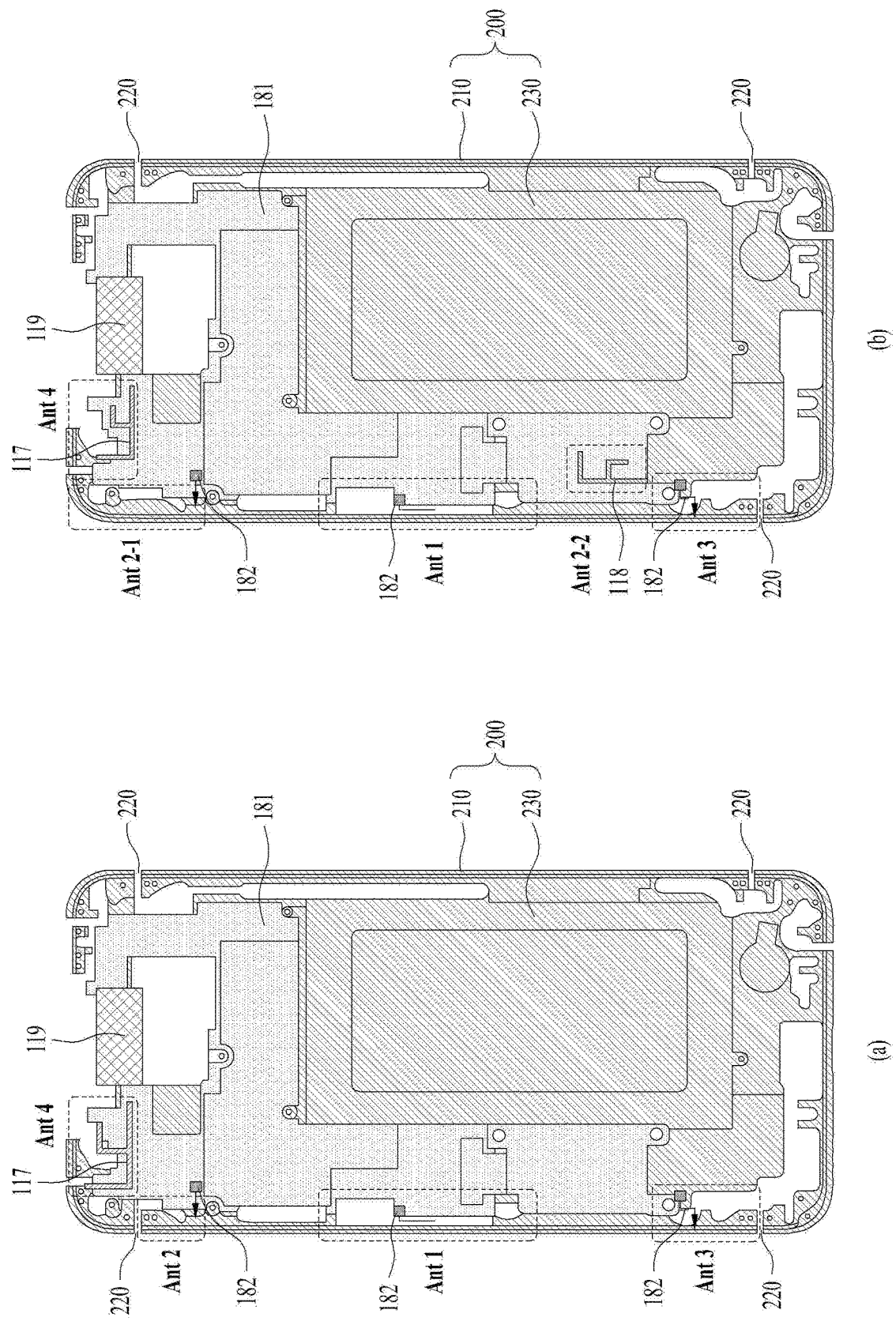
Figure 8:
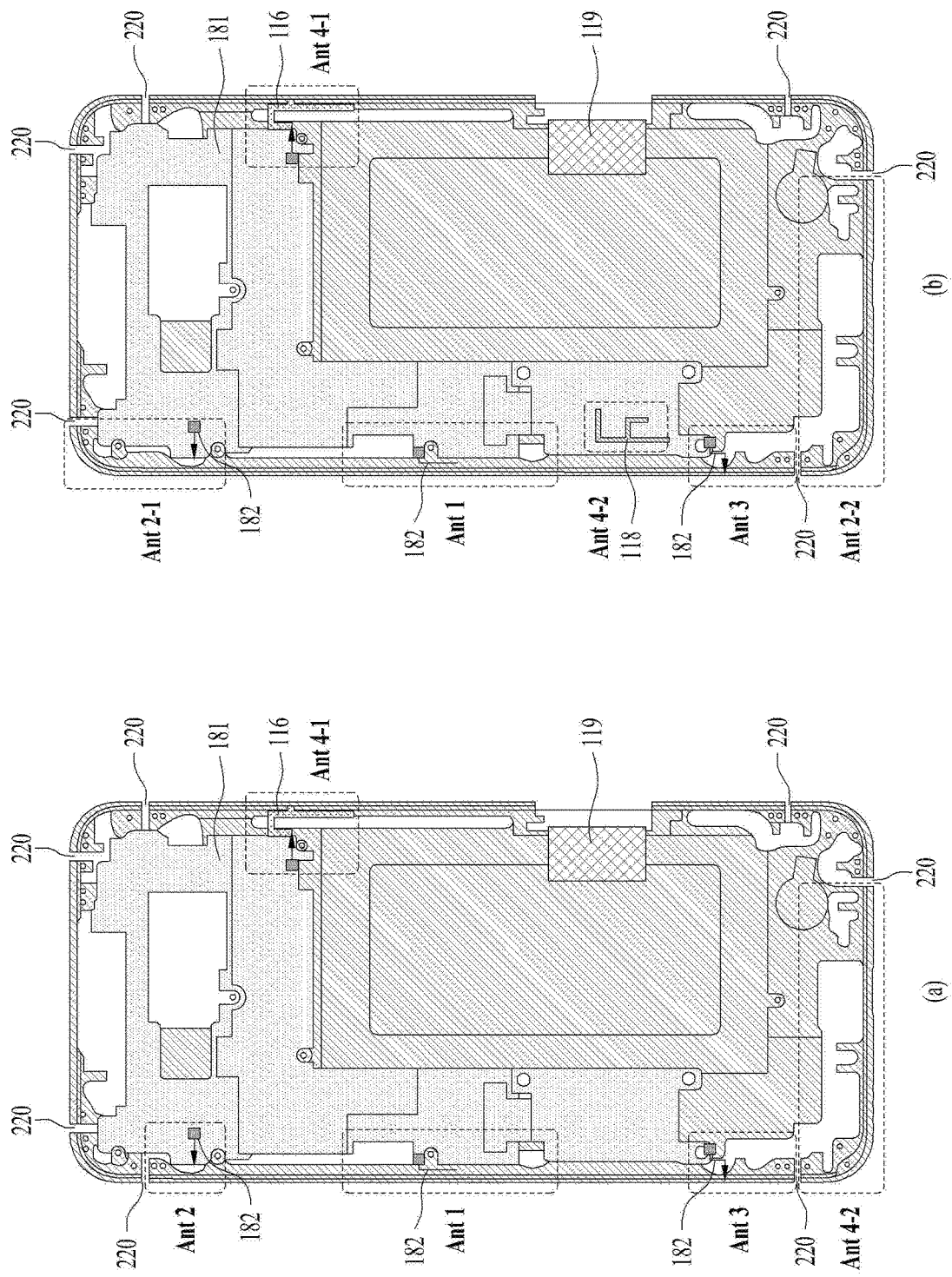

FIGS. 7, 8 and 10 are diagrams illustrating another embodiment of the antenna arrangement. The mobile terminal 100 of this embodiment may further include an antenna configured to receive a signal of the millimeter-wave (mm-Wave) as well as the antenna for a sub-6 band (N41 and N78) so as to facilitate the diverse mobile communications including LTE, sub-6 and mmWave. The mmWave uses an ultra-high frequency signal having an mm-unit short wavelength and has a short wavelength, such that the size of the antenna for the mmWave may be small. When using the ultra-high frequency signal, the frequency band may become wide and the data transmission speed and amount may be enhanced.

The antenna used for the conventional mobile communication has the beam pattern which spreads without directivity to radiate an electromagnetic wave. In this instance, much energy is consumed for signal transmission enough to lower its benefits disadvantageously. However, when a signal transmitting end uses a beam-pattern radiation method configured to emit the signal toward a receiving end, even less energy facilitates mobile communication.

Beam patterns of the antennas are combined by using a plurality of radiation elements, only to realize a sharp beam pattern. An array antenna using the plurality of the radiation elements makes sharper beam pattern so as to transmit a signal in a specific direction farther. The direction of the beam pattern may be adjusted by adjusting the power supplied to the plurality of the radiation elements.

Even the performance of the millimeter-wave (mmWave) antenna 119 could be deteriorated, in case the mmWave antenna 119 is arranged adjacent to another antenna. Accordingly, the mmWave antenna 119 may be arranged not to be overlapped with the antenna connected with the first wireless communication unit 110a or the second wireless communication unit 110b. in other words, the area of the side portion 210 where the mmWave antenna 119 is arranged may be omitted and the omitted side portion 210 may not be used as the sub-6 antenna or the LTE antenna, only to reduce the number of the side portions 210 usable as the antennas.

In the embodiment of FIG. 7, the mmWave antenna 119 is arranged in the upper area of the mobile terminal 100, while the upper side portion 210 is partially omitted. FIG. 7 (a) illustrates that the slit 220 is formed in a left upper end and FIG. 7 (b) illustrates the antenna arrangement when one slit 220 is reduced by omitting the slit 220 formed in left upper end. When the number of the slits 220 is reduced as mentioned above, the space where the side portion 210 is used as the antennas may become narrow and it is then necessary to realize the antenna by using another member rather than the side portions (e.g., a pattern).

In the embodiment of FIG. 7 (a), the first through third antennas (Ant1~Ant3) may be realized by using the side portion 210 provided in the same position with the position when no mmWave antenna 119 is provided (see the embodiment of FIG. 3). In this embodiment, an antenna configured to receive the N41 band signal may be provided and the antenna for the N41 band has to be longer than the antenna for the N78, such that it may be difficult to arrange the two antennas in one side of the mobile terminal 100 simultaneously. Accordingly, the antennas may be arranged in different positions or another type antenna such as a pattern antenna may be used.

As shown in FIG. 7 (a), a conductive pattern 117 may be formed in an upper area of the case, substrate or antenna carrier to realize the pattern antenna (Ant4). The pattern antenna (Ant4) may be realized as an independent antenna connected with the first wireless communication unit 110a. As the side portion 210 for the mmWave antenna 119 is partially omitted in the upper area of the mobile terminal 100, the pattern antenna (Ant4) may be arranged adjacent to the side-portion-omitted-area so as to secure the antenna performance.

When the slit 220 is omitted as shown in FIG. 7 (b), the second antenna (Ant2-1) may be moved to an upper area and the interference with the fourth antenna (Ant4) could occur or it may be combined with the antenna for the second wireless communication unit 110b to be the common antenna. The common antenna has to realize the structure configured to facilitate the multi-resonance having two or more resonance frequencies in terms of the performance, compared with the independent antenna, such that it may be difficult to realize the performance and structure. In this instance, the second antenna may be moved to another position as the pattern antenna (118, Ant2-2).

FIG. 8 illustrates that the mmWave antenna 119 is arranged in the lateral surface of the mobile terminal 100. Similar with the embodiment of FIG. 7, the first through third antennas (Ant1~Ant3) may be realized similarly. Different from the embodiment of FIG. 7, this embodiment has the side portion 210 provided in the upper area of the mobile terminal 100 and it may be difficult to use the pattern antenna (Ant4) of FIG. 7.

Instead, the embodiment of FIG. 8 (a) may use a pattern antenna (Ant4-1) configured to perform radiate by using the button hole 242 and the button gap 243 provided in the side button 123b. The pattern antenna using the button hole 242 and the button gap 243 has a similar structure with the pattern antenna (Ant4-1) shown in FIG. 6 such that detailed description thereof will be omitted.

In this instance, an auxiliary antenna structure has to be provided in the pattern antenna (Ant4) and the side portion 210 provided in the lower end of the mobile terminal 100 may be used as shown in FIG. 8 (a). The side portion 210 provided in the lower end area of the mobile terminal may be connected with the wireless communication unit 110b to be used as the antenna for LTE and then used as the common antenna connected with the first wireless communication unit 110a and the second wireless communication unit 110b to receive the LTE signal and the 5G signal, not the independent antenna functioned only as the antenna for the first wireless communication unit 110a.

When one upper slit 220 is omitted as shown in FIG. 8 (b), the second antenna (Ant2) may be used as the common antenna (Ant2-1) or the pattern antenna (Ant2-2) as shown in FIG. 7 (b).

Figure 9:
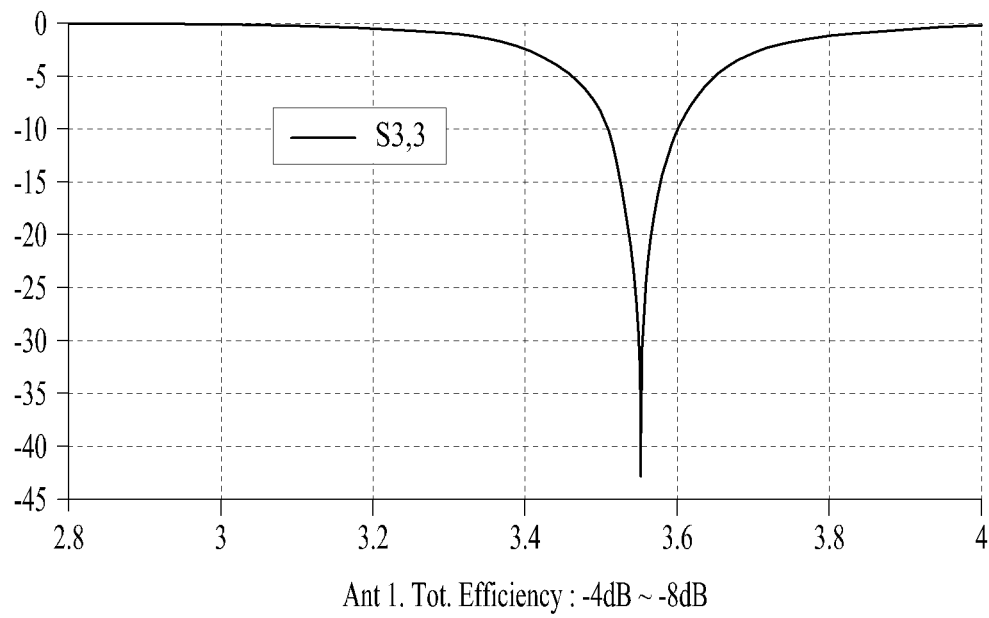
FIG. 9 is a diagram to describe the performance of the antenna shown in FIG. 8 (b).
Figure 9:
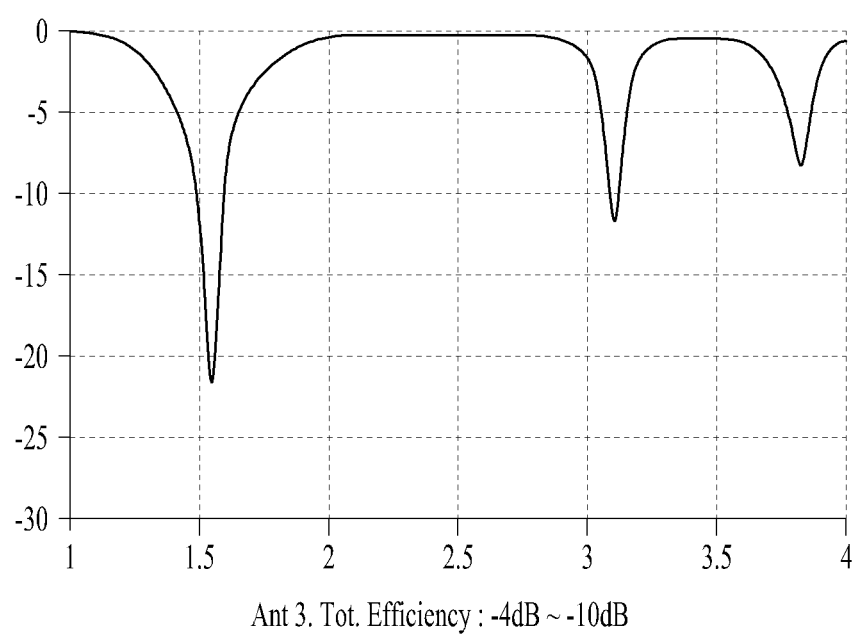

FIG. 9 (a) is a graph illustrating the performance of the independent antenna (the first antenna) shown in FIG. 8 (b) and FIG. 9 (b) is a graph illustrating the performance of the common antenna (the 2-1 antenna (Ant2-1)) shown in FIG. 8 (b). In the drawings, a projected area sharply projected downwards is corresponding to the resonance frequency. The independent antenna has one resonance frequency in 3.5 GHz band and the common antenna has a resonance frequency in the 1.5 GHz band and the 3 GHz band. In other words, the common antenna is able to receive the LTE signal and the 5G signal by using the multi-resonance.

FIG. 10 is a diagram illustrating the arrangement of the antenna using the side portion 210 when the mmWave antenna 119 is arranged in the lower area of the mobile terminal 100. The bezel of the lower front surface of the mobile terminal 100 between the display unit 151 is wider than that of the lateral surface such that the radiation can be performed via the space formed between the display unit 151 and the side portion 210. Accordingly, it may not be necessary to omit the side portion 210 when the mmWave antenna 119 is arranged in the lower area.

However, when the mmWave antenna 119 is arranged in the lower area, the antenna using the side portion 210 provided in a lower corner adjacent to the mmWave antenna 119 may have a deteriorated performance. Accordingly, the antenna (Ant4-3) may use the side portion 210 provided in an upper area with respect to the lower slit 220 (in other words, provided in a direction which is farther from the mmWave antenna 119) as shown in FIG. 10 (a).

In case the number of the antennas connected with the second wireless communication unit 110b is insufficient, the antennas may be used as the common antenna or the independent antenna configured to receive only the first signal via the first wireless communication unit 110a.

As mentioned above, the mobile terminal in accordance with the present disclosure may include the common antenna which is connectable with the two or more wireless communication units in the limited area and configured to receive the different signals. Accordingly, the antennas for the LTE communication and the 5G communication may be arranged in the limited space.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:
1. A mobile terminal comprising:
a display;
a middle frame comprising:
a supporting portion supporting a rear surface of the display; and
a side portion formed around the supporting portion, the side portion defining a lateral external appearance of the mobile terminal;
a main board located at a rear surface of the middle frame, the main board comprising:
a ground;
a first wireless communication unit configured to transceive a first signal; and
a second wireless communication unit configured to transceive a second signal, a frequency of the second signal is lower than a frequency of the first signal; and
a rear case configured to cover a rear surface of the main board,
wherein the side portion comprises a plurality of conductive members of which ends are divided into slits,
wherein the plurality of the conductive members comprise:
at least one first radiator electrically connected with the first wireless communication unit and configured to receive the first signal; and
at least one second radiator electrically connected with the first wireless communication unit and the second wireless communication unit and configured to receive the first signal or the second signal,
wherein the first radiator includes a side conductive member placed at a left or right lateral surface of the mobile terminal and forming a slot antenna with the supporting portion, and
wherein the first radiator forms a closed slot antenna having two closed ends configured of one end connected with the supporting portion and the other end connected with the supporting portion or the ground of the main board.

2. The mobile terminal of claim 1, wherein the closed slot antenna is electrically connected with the second wireless communication unit between the two closed ends and configured to receive the first signal.

3. The mobile terminal of claim 2, wherein:
a length of the first radiator corresponds to one half of a wavelength of the first signal.

4. The mobile terminal of claim 1, wherein the first radiator forms an open slot antenna having one end connected with the supporting portion and the other end provided in the slit, together with the supporting portion.

5. The mobile terminal of claim 4, wherein a length of the open slot antenna corresponds to one fourth of a wavelength of the first signal.

6. The mobile terminal of claim 4, wherein two slot antennas are arranged in a lateral direction of the mobile terminal side by side.

7. The mobile terminal of claim 1, wherein:
the first radiator is configured to transmit and receive the first signal.

8. The mobile terminal of claim 1, further comprising:
a non-conductive molding material disposed between the plurality of conductive members and the supporting portion;
a feeding line connected with the first wireless communication unit or the second wireless communication unit and configured to feed the conductive members; and a connection clip inserted in the non-conductive molding material and comprising one end contacting the conductive members and the other end contacting with the feeding line.

9. The mobile terminal of claim 1, further comprising:
a non-conductive molding material disposed between the plurality of conductive members and the supporting portion; and
a feeding line connected with the first wireless communication unit or the second wireless communication unit and comprising one end contacting the non-conductive molding material, the feeding line configured to feed the conductive members by a coupling method.

10. The mobile terminal of claim 1, wherein the side portion comprises:
an open portion of which a predetermined area is between the conductive members, and larger than the slits; and
an array antenna arranged adjacent to the open portion.

11. The mobile terminal of claim 1, further comprising:
a space formed between the display and a lower end of the middle frame; and
an array antenna arranged adjacent to the space.

12. The mobile terminal of claim 1, wherein at least one of the slits is provided in at least one end of the second radiator.

13. The mobile terminal of claim 1, wherein the second radiator is placed at an upper area or a lower area of the mobile terminal.

14. The mobile terminal of claim 1, wherein the second radiator has two or more resonance frequencies.

15. The mobile terminal of claim 1, wherein:
the first signal is a New Radio (NR) signal; and
the second signal is a Long Term Evolution (LTE) signal.

16. The mobile terminal of claim 1, wherein:
the first signal has a frequency of 2.5 GHz or more and 6 GHz or less; and
the second signal has a frequency of 2.7 GHz or less.

17. The mobile terminal of claim 1, further comprising:
a top button located in the side portion;
a button gap formed by the side portion having the top button inserted therein and the supporting portion spaced apart from the side portion;
a switch substrate provided in the button gap and configured to generate a signal when the top button is pressed; and
a pattern antenna having a predetermined area overlapped with the button gap, the pattern antenna configured to receive the first signal when electrically connected with the first wireless communication unit.

18. The mobile terminal of claim 17, wherein the pattern antenna is connected and grounded with the middle frame.

19. The mobile terminal of claim 17, wherein the pattern antenna is formed at an inner surface of the rear case.

20. The mobile terminal of claim 17, wherein a length of the pattern antenna corresponds to one fourth of a wavelength of the first signal.

* * * * *